United States Patent
Sidhu et al.

(10) Patent No.: US 12,310,373 B2
(45) Date of Patent: May 27, 2025

(54) AMORPHOUS MATERIAL SHAPER

(71) Applicant: Machine Specialties VA LLC, Ashland, VA (US)

(72) Inventors: Joshua Sidhu, Henrico, VA (US); John J. McIsaac, Dedham, MA (US)

(73) Assignee: MACHINE SPECIALTIES VA LLC, Ashland, VA (US)

( * ) Notice: Subject to any disclaimer, the term of this patent is extended or adjusted under 35 U.S.C. 154(b) by 532 days.

(21) Appl. No.: 17/499,435

(22) Filed: Oct. 12, 2021

(65) Prior Publication Data

US 2022/0117239 A1 Apr. 21, 2022

Related U.S. Application Data

(60) Provisional application No. 63/093,843, filed on Oct. 20, 2020.

(51) Int. Cl.
*A21C 3/04* (2006.01)
*A21C 7/01* (2006.01)
*A21C 7/02* (2006.01)
*A23P 30/10* (2016.01)

(52) U.S. Cl.
CPC ............... *A21C 3/04* (2013.01); *A21C 7/01* (2013.01); *A21C 7/02* (2013.01); *A23P 30/10* (2016.08)

(58) Field of Classification Search
CPC .... A21C 3/04; A21C 7/01; A21C 7/02; A23P 30/10; A23P 30/20
See application file for complete search history.

(56) References Cited

U.S. PATENT DOCUMENTS

| | | | | |
|---|---|---|---|---|
| 4,928,591 A | * | 5/1990 | Lindee | A22C 7/00 99/485 |
| 5,605,708 A | * | 2/1997 | Cummins | A21C 7/01 425/332 |
| 5,714,178 A | * | 2/1998 | Keener | A21C 7/01 425/332 |
| 5,786,016 A | * | 7/1998 | Campbell | A21C 7/01 425/332 |
| 6,123,537 A | * | 9/2000 | Cummins | A21C 7/01 425/332 |

(Continued)

FOREIGN PATENT DOCUMENTS

| | | | | | |
|---|---|---|---|---|---|
| GB | 2183533 A | * | 6/1987 | | A21C 7/02 |
| IT | 1228760 B | * | 7/1991 | | A22C 7/00 |

*Primary Examiner* — Seyed Masoud Malekzadeh (57) ABSTRACT

A tunnel shaper including an elongated forming tunnel for shaping amorphous food materials into a desired shape. The forming tunnel includes a bore defined by an inner wall. A channel extends along the length of the forming tunnel and is in open communication with the bore. A top tunnel extends along the tunnel in alignment with the channel. The top tunnel is adjustable with respect to the forming tunnel in order to control the shape of a amorphous material piece processed by the shaper. An adjustment bar and one or more adjustment shafts extend between the adjustment bar and the forming tunnel. A conveyor belt conveys amorphous material pieces through the bore of the forming tunnel and the distance of the top tunnel with respect to the forming tunnel is adjusted in order to control the shape of a amorphous material piece processed by the shaper.

14 Claims, 6 Drawing Sheets

(56) References Cited

U.S. PATENT DOCUMENTS

| | | | | |
|---|---|---|---|---|
| 6,159,517 | A * | 12/2000 | Watts | A21C 7/01 425/332 |
| 6,207,212 | B1 * | 3/2001 | Nanahara | A21C 9/08 425/335 |
| 6,335,046 | B1 * | 1/2002 | Mackey | A21C 7/01 425/332 |
| 6,382,952 | B1 * | 5/2002 | Cummins | A21C 7/01 425/332 |
| 6,506,042 | B1 * | 1/2003 | Watts | A21C 7/01 425/332 |
| 9,392,798 | B2 * | 7/2016 | Morikawa | A21C 7/00 |
| 9,854,814 | B2 * | 1/2018 | Morikawa | A21C 7/02 |
| 10,117,437 | B2 * | 11/2018 | Higuchi | A21C 7/01 |
| 10,306,896 | B2 * | 6/2019 | Schmidt | A21C 7/01 |
| 10,383,340 | B2 * | 8/2019 | Freed | A21C 7/01 |
| 10,897,912 | B2 * | 1/2021 | Schmidt | A21C 7/01 |
| 2015/0157029 | A1 * | 6/2015 | Morikawa | A21C 7/02 425/332 |
| 2017/0027181 | A1 * | 2/2017 | Morikawa | A21C 7/02 |
| 2018/0092367 | A1 * | 4/2018 | Schmidt | A21C 7/01 |
| 2019/0008166 | A1 * | 1/2019 | Freed | A21C 9/08 |
| 2020/0221713 | A1 * | 7/2020 | Schmidt | A21C 7/02 |
| 2022/0007657 | A1 * | 1/2022 | Schmidt | A21C 7/02 |

\* cited by examiner

AMORPHOUS MATERIAL SHAPER

CROSS-REFERENCE TO RELATED APPLICATIONS

This application claims the benefit of Provisional U.S. Patent Application Ser. No. 63/093,843 filed Oct. 20, 2020, the contents of which are incorporated herein by reference in their entirety.

FIELD OF THE INVENTION

The present invention generally relates to devices for shaping of amorphous materials into a desired shape, and more particularly to a shaper including a tunnel for transporting an amorphous material along a belt while forming it into a desired shape.

BACKGROUND OF THE INVENTION

Amorphous masses, which could be food masses such as dough, ground meat, cheese, energy bar mixes, dog food, and similar materials or non-food masses, are typically shaped by processing equipment into a desired shape for baking, packaging, or other subsequent processing. The amorphous mass may be shaped into a spherical, oblong, cylindrical, football-shaped, or other desired shape. As an example, dough may be shaped into a spherical shape for subsequent baking, packaging, and sale.

These amorphous masses are typically converted into spherical shape using a rounding apparatus, which includes a continuous conveyor belt with a plurality of rounding bars mounted over the belt. Each rounding bar includes a concave face for rounding the dough as the dough is conveyed against the face. In order to increase the production rate, the typical rounding apparatus includes multiple rounder bars mounted above the conveyor belt. Each rounding bar with its concave face must be oriented at an angle with respect to the conveyor belt.

When a piece of dough is dropped on the surface of a conveyor and contacts the concave shaping surface of a rounder bar, the dough piece is decelerated from the speed of the belt and rotates on both the surface of the rounder bar and on the surface of the conveyor. The frictional engagement of the outer surface of the dough piece with the shaping surface of the rounder bar causes the dough piece form into a round shape. The dough piece then rolls along the belt and across the concave face of the rounder bar, usually allowing the dough piece to roll over any portion of the belt that has a hump or a trough.

Unfortunately, although many variations of the rounder apparatus have been proposed, the prior art rounder bar assemblies are unable to fully conform to humps or troughs in the surface of the conveyor belt. As a result, dough from a dough piece can leak between the lower edge of the stationary rounder bar and the facing surface of the moving conveyor belt as the dough piece is reoriented along the belt, which could cause non-spherical dough pieces. Although various prior art rounder bar assemblies have addressed this problem by introducing a flexible foot on the rounder bar, these modifications do not adequately solve the problem of non-spherical dough pieces.

The rounding bar with its concave face must be oriented at an angle with respect to the conveyor belt thus limiting the production rate on the prior art rounders, as each rounder bar must extend a substantial distance across the belt in order to provide adequate working area between the belt and each rounder bar in order to form each dough piece into the desired shape.

Accordingly, it would be advantageous to provide an apparatus and method for forming dough and other amorphous materials into a desired shape.

Therefore, an object of the present invention is to provide an apparatus that can be controlled to form amorphous materials into a desired shape, such as spherical, oblong, cylindrical, football-shaped, or additional shapes as desired.

Yet another object of the present invention is to provide an apparatus in which the forming portion of the apparatus does not extend across the belt and thereby limit the production rate.

These and further objects and advantages will become clear when reading the following specification along with reference to the associated drawings.

BRIEF SUMMARY OF THE INVENTION

The current invention is a tunnel shaper for shaping amorphous materials into a desired shape. The tunnel shaper includes an elongated forming tunnel mounted to a surface. The forming tunnel includes a bore defined by an inner wall. A channel extends along the length of the forming tunnel and is in open communication with the bore. A top tunnel extends along the tunnel in alignment with the channel. The top tunnel is adjustable with respect to the forming tunnel in order to control the shape of the amorphous material piece being processed. An adjustment bar and one or more adjustment shafts extend between the adjustment bar and the forming tunnel. A conveyor belt conveys amorphous material through the bore of the forming tunnel and the distance of the top tunnel with respect to the forming tunnel is adjusted in order to control the shape of the material being processed.

BRIEF DESCRIPTION OF THE SEVERAL VIEWS OF THE DRAWING(S)

Reference is made herein to the accompanying drawings, which are not necessarily drawn to scale, and wherein.

DETAILED DESCRIPTION

Figure 1:
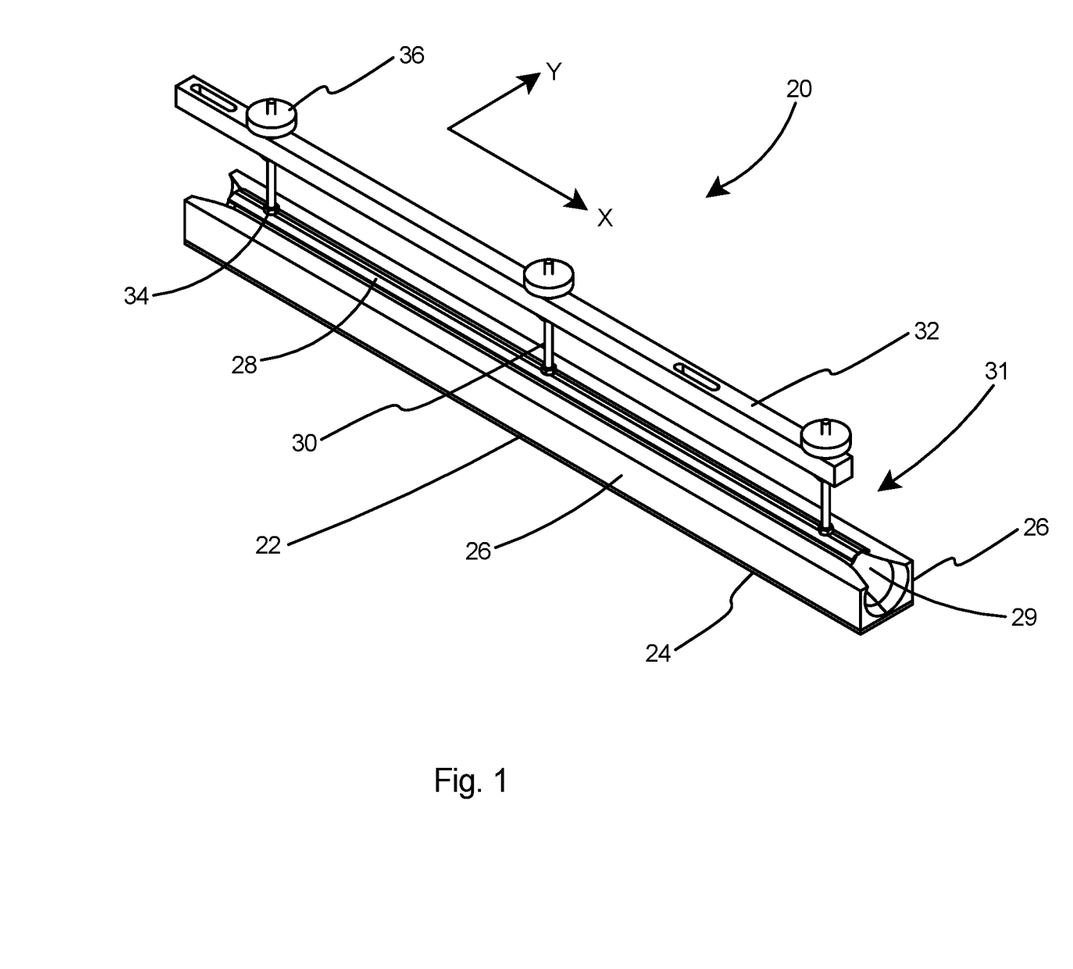
FIG. 1 is a perspective view of a tunnel shaper for forming amorphous materials into a desired shape in accordance with embodiments of the invention.

With reference to FIG. 1, the present invention is a belt-fed tunnel shaper 20 for forming and converting an amorphous mass, which could be a food mass or a non-food mass, into a desired shape. The tunnel shaper is ideal for shaping low elasticity food materials, such as dough, ground meat, cheese, energy bar mixes, dog food, and similar low elasticity non-food masses into a desired shape.

Figure 4:
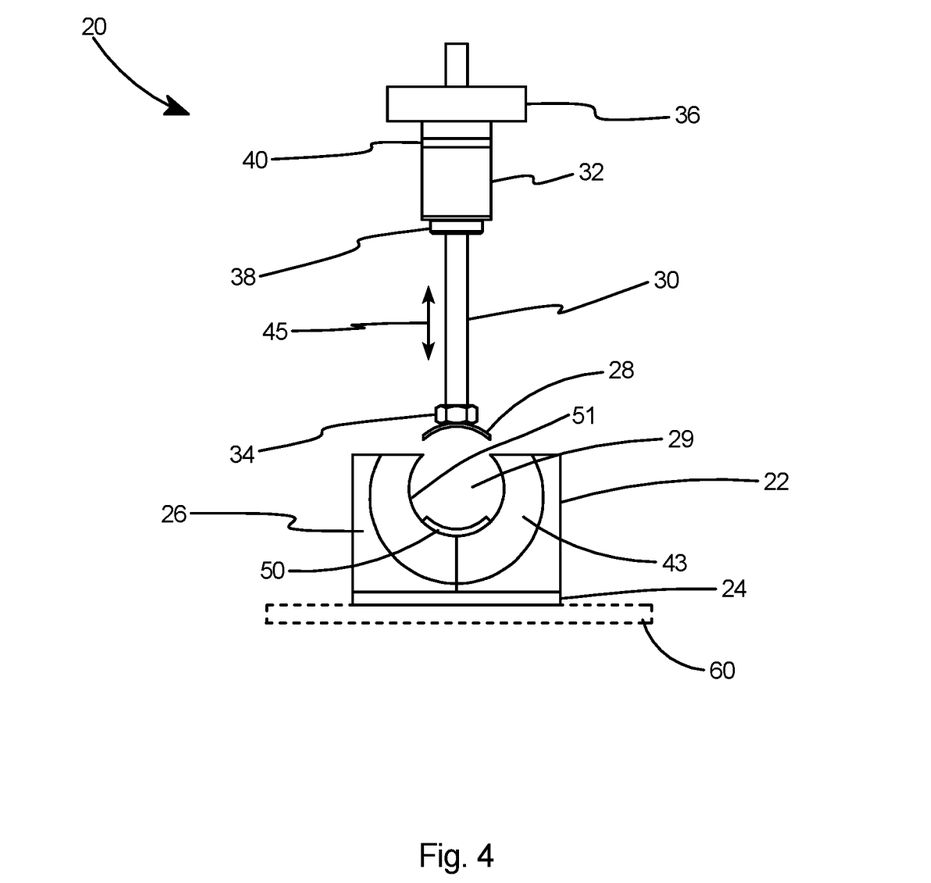
FIG. 4 is an end elevation view of the tunnel shaper, including the conveyor belt.
Figure 6:
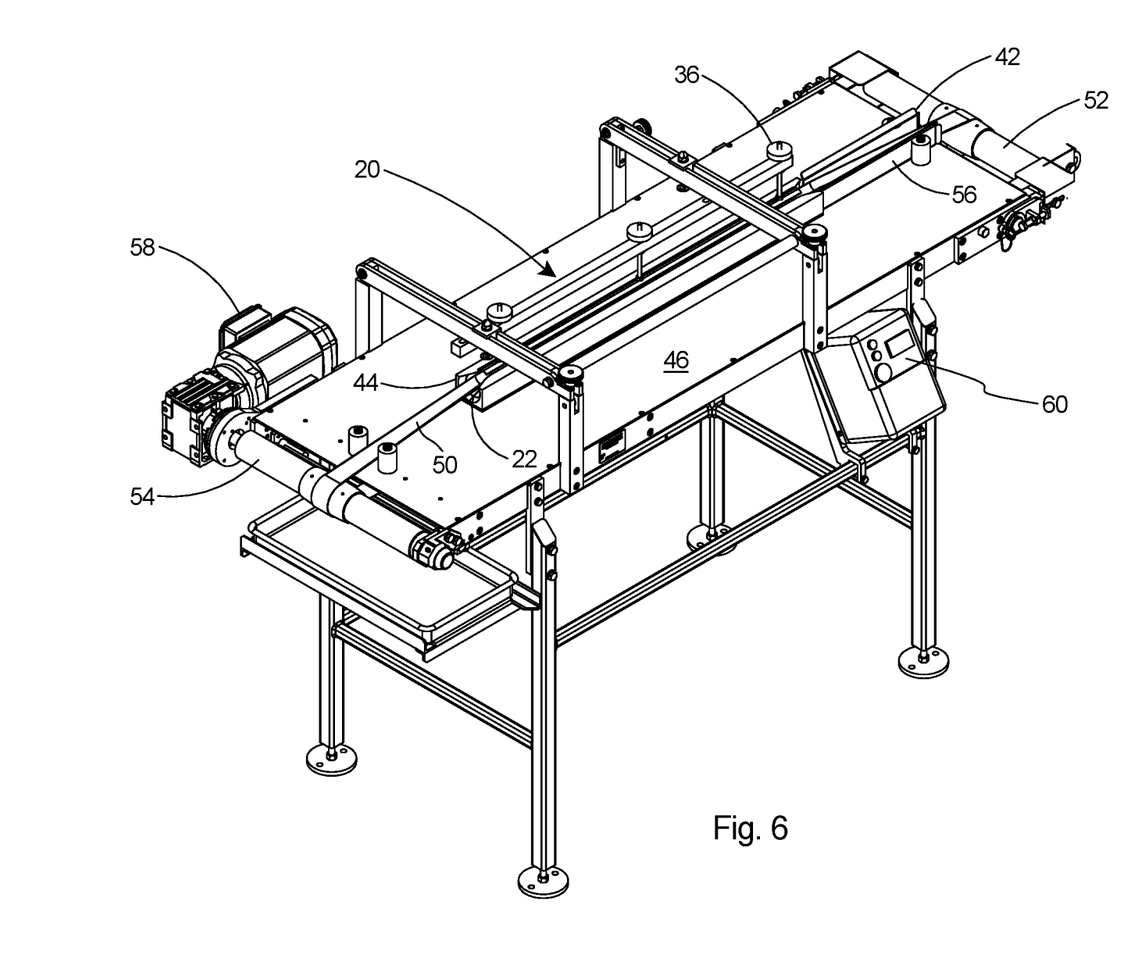
FIG. 6 is a perspective view of a tunnel shaper mounted on a surface and configured to form amorphous material into a desired shape in accordance with embodiments of the invention.

With reference to FIGS. 1 and 4, the tunnel shaper 20 includes a forming tunnel 22 including a base plate 24, two side plates 26, and an adjustable top tunnel 28. The forming tunnel 22 is a tubular structure with a bore 29 therethrough. Various zones of the top tunnel 28 can be moved up or down by an adjustment arrangement 31 including one or more adjusting shafts 30 that extend through an adjustment bar 32 and engage a corresponding retainer nut 34 connected to the top tunnel 28. Each adjustment shaft 30 includes a corresponding adjustment knob 36 that may be rotated in a desired direction to either raise or lower the top tunnel 28 with respect to the forming tunnel 22 and thereby increases or decreases the effective size of the forming tunnel. Although the embodiment of FIG. 1 depicts the forming tunnel 22 formed by two side plates and a base plate, it is also within the scope of the invention that the forming tunnel may be a single block of material with a tunnel or bore machined therein. The forming tunnel 22 includes a longitudinal direction X and a lateral direction Y. As shown in the side elevation view of FIG. 2, the elongated forming tunnel 22 is positioned in a horizontal orientation, with the longitudinal direction X direction (see FIG. 1) being positioned in a horizontal orientation. As shown in FIGS. 4 and 6, the conveyor belt 50 extends horizontally through and at the bottom of the bore 29 of the forming tunnel 22.

Figure 2:
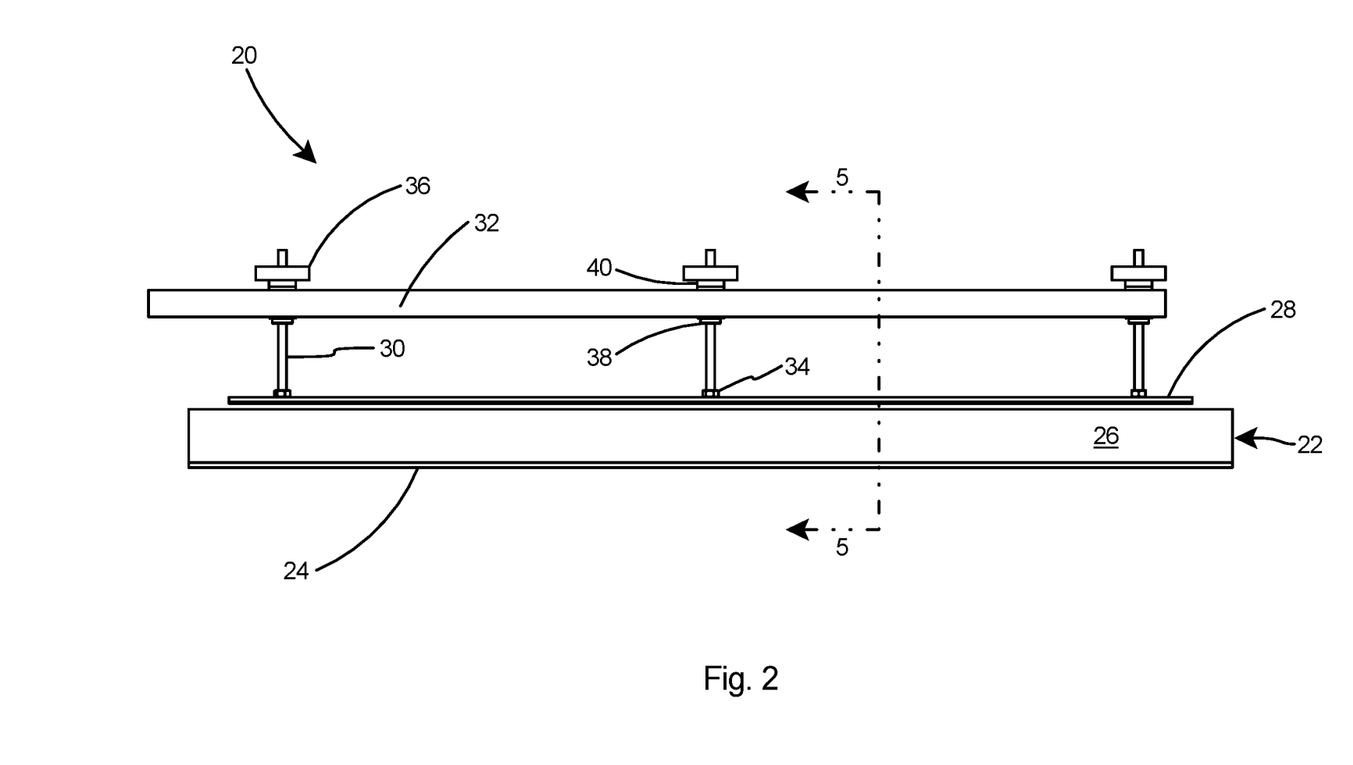
FIG. 2 is a side elevation view of the tunnel shaper.

Referring to FIG. 2, the adjusting shafts 30 and adjustment knobs 36 are preferably spaced along the length of the adjustment bar 32 to enable zonal adjustment at various locations along the forming tunnel 22. A retaining ring 38 on each adjusting shaft 30 retains the adjustment bar 32 spaced from and substantially parallel with the top tunnel 28. A bushing 40 is positioned between each adjustment knob 36 and the adjustment bar 32.

Figure 3:
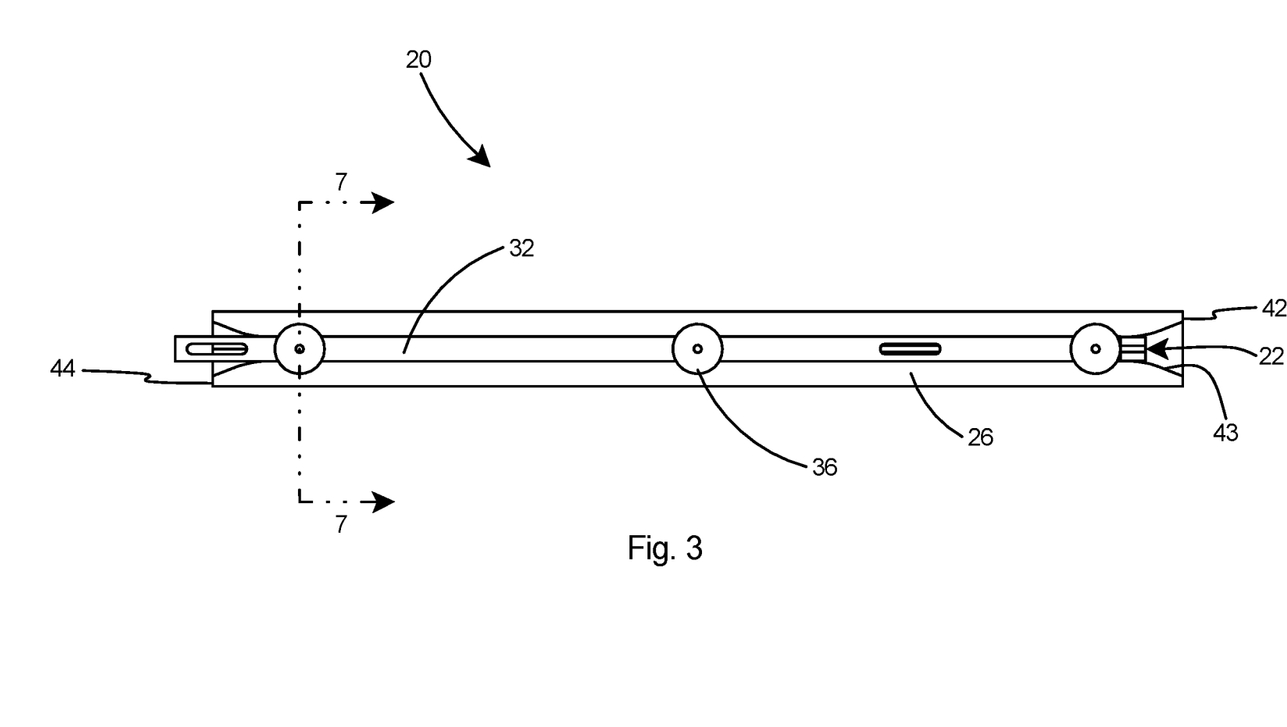
FIG. 3 is a plan view of the tunnel shaper.

With reference to FIG. 3, the forming tunnel 22 includes an infeed end 42 and a discharge end 44. One or more of the ends of the forming tunnel 22 includes a funnel entry 43 that is wider than the diameter of the bore 29 in the forming tunnel 22.

Referring to FIG. 4, in operation the conveyor belt 50 is driven through the bore 29 of the forming tunnel 22. The adjustment bar 32 is mounted a fixed distance from the mounting surface 46 and the forming tunnel 22. Rotation of the adjustment knob 36 will turn the adjustment shaft 30 and, depending on the direction of rotation, will move the top tunnel 28, as indicated by adjustment direction 45, closer or farther away from the forming tunnel 22 thereby changing the effective diameter of the forming tunnel. The forming tunnel 22 embodiment shown in FIG. 4, having a substantially circular profile, is used to form amorphous material into a spherical shape. The adjustment knobs 36 can be rotated to increase or decrease the size of the shaped product emerging from the discharge end of the dough shaper. It is within the scope of the invention that the shape of the bore within the forming tunnel 22 can be other than circular in order to form other product shapes, such as to form an ellipse or a football shape. As the amorphous mass is carried by a conveyor belt 50 through the forming tunnel 22, the amorphous material will be fully encompassed by the forming tunnel and it will undergo a kneading and shaping process as it travels through the forming tunnel. The bore 29 is defined by an inner wall 51 within the forming tunnel 22.

Figure 5:
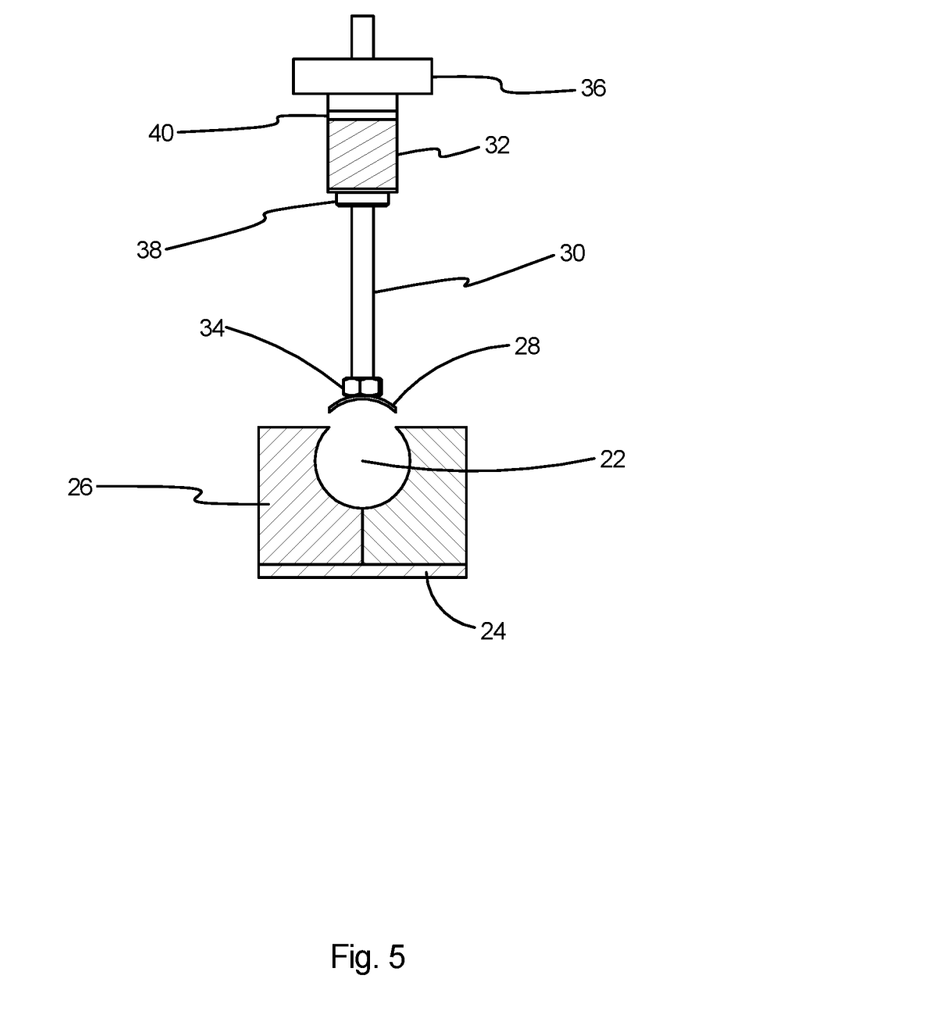
FIG. 5 is a sectional view of the of the tunnel shaper taken along line 5-5 of FIG. 2.

In addition to the fixed arrangement shown in FIG. 5, top tunnel 28 could be spring-loaded for sizing and shaping. Both the top tunnel 28 and the base 24 could be spring-loaded either individually or together or any combination.

With reference to FIG. 6, a tunnel shaper 20 according to the present invention is shown mounted above a surface 46. A conveyor belt 50 runs through the forming tunnel 22 and conveys an amorphous mass through the forming tunnel 22. The tunnel shaper 20 may also include a feed roller 52 and a discharge roller 54 for driving the belt 50 through the tunnel. An entry chute 56 may be provided for guiding the mass to the infeed end 42 of the shaper. A motor 58 provides power for driving the rollers which in turn drives the belt 50. A control box 60 may be provided to control the speed of the rollers and thus the conveyor belt 50. Any one or more of the adjustment knobs 36 may be rotated as desired to control the size and shape of a shaped product at the discharge end 44 of the tunnel shaper.

Although FIG. 6 depicts a single amorphous material shaper on a surface for illustration purposes, it is within the scope of the invention that multiple tunnel shapers can be mounted side-by-side on the surface in order to accommodate a desired production rate. Unlike dough rounders, the amorphous material shaper of the invention is not at an angle with respect to the surface or belt, but rather is aligned longitudinally along the surface, with a separate belt running through each tunnel, thus there is no limit to the number of shapers that can be mounted on the surface. For multiple shapers on a surface, separate belts would be run through each forming tunnel 22. The interior surface of the tunnel could be smooth, or serrated, pocketed, or of other textures.

The material of construction of the base plate 24 is preferably stainless steel. The forming tunnel 22, including the side plates 26, and top tunnel 28, are preferably constructed of food grade acetal materials, such as DELRIN®, available from DuPont, Wilmington, Delaware, but can also be constructed of other food grade plastics such as UHMWPE or oil-impregnated UHMWPE. Other acceptable materials are coated metals, such as stainless steel or aluminum wherein the metal is preferably coated with TEFLON®, available from DuPont, Wilmington, Delaware. For processing food masses, all materials in contact with the amorphous material are preferably food grade materials.

Existing state of the art dough rounders do not form dough or other materials into a perfect spherical shape. The critical advantage afforded by the tunnel shaper 20 of the present invention is that it easily forms dough or other low elasticity food or non-food masses into a perfect spherical shape. The amorphous material shaper is advantageous for transforming amorphous food materials, such as meatballs, cake batter, dog food, and energy bars, or non-food masses into a desired shape, which may be subsequently processed into other shapes such as converting spherical dough into flat circular items such as tortillas, The amorphous material shaper would be advantageous for food masses that are difficult to shape by existing state of the art dough rounders. Dough rounders are problematic as they tend to form a non-spherical shape, such as a lemon or a football shape, and, after tension, do not release a substantially spherical shaped food mass. The amorphous material shaper is advantageous in that the shaped mass releases well after tension.

A further advantage of the amorphous material shaper is the ease of disassembly, which is at times required for occasional cleaning of the forming surfaces. As compared to a dough rounder, the amorphous material shaper minimizes residue buildup on the conveyor belt and eliminates friction and wear of a belt against a table.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A tunnel shaper for shaping amorphous materials into a desired shape comprising:
   an elongated forming tunnel positioned in a horizontal orientation, said forming tunnel including a bore therein and side ends, said bore defined by an inner wall;
   a channel along a length of the forming tunnel in open communication with the bore;
   a top tunnel extending along the length of the tunnel in alignment with the channel and configured to be adjustable with respect to the forming tunnel;
   a conveyor belt positioned horizontally through and at a bottom of said bore of said forming tunnel to convey an amorphous material piece through said bore of the forming tunnel; and
   an adjustment bar is mounted at a fixed distance from the forming tunnel;
   wherein one or more of the side ends of the forming tunnel includes a funnel entry that has a wider diameter than a diameter of the bore of the forming tunnel.

2. The tunnel shaper of claim 1, wherein said adjustment bar comprises:
   one or more adjustment shafts extending between said adjustment bar and said forming tunnel.

3. The tunnel shaper of claim 2, comprising an adjustment knob integral with said one or more adjustment shafts.

4. The tunnel shaper of claim 1, wherein said forming tunnel comprises a base plate and two side plates.

5. The tunnel shaper of claim 2, comprising a retainer nut for retaining said one or more adjustment shafts to said top tunnel.

6. The tunnel shaper of claim 2, comprising a threaded bore in said adjustment bar for retaining said one or more adjustment shafts.

7. The tunnel shaper of claim 3, comprising a bushing between said adjustment knob and each of said adjustment shafts.

8. The tunnel shaper of claim 1, wherein said side ends of the tunnel includes an infeed end and a discharge end.

9. The tunnel shaper of claim 1, comprising:
   said elongated forming tunnel includes a longitudinal direction and a lateral direction; and
   said top tunnel is of arcuate shape in the lateral direction.

10. The tunnel shaper of claim 1, comprising one or more rollers for driving said conveyor belt through the bore of the forming tunnel.

11. The tunnel shaper of claim 10, comprising:
    Said bore including the inner wall having a shape;
    said conveyor belt is flexible; and
    said conveyor belt conforms to a shape of the inner wall of the bore as it is driven through the bore.

12. The tunnel shaper of claim 10, comprising one or more motors for rotating said rollers.

13. The tunnel shaper of claim 12, comprising a control box to control speed of the rollers and conveyor belt.

14. The tunnel shaper of claim 1, comprising a plurality of said forming tunnels mounted to a surface, each of said forming tunnels including a corresponding top tunnel extending along the length of the tunnel in alignment with the channel.

* * * * *